US009280930B2

(12) United States Patent
Somerville et al.

(10) Patent No.: US 9,280,930 B2
(45) Date of Patent: Mar. 8, 2016

(54) BACK TO BACK PRE-CHARGE SCHEME

(75) Inventors: Alan Somerville, Tokyo (JP); Shiho Hiroshima, Tokyo (JP); Toshiki Kitaguchi, Hikone (JP)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 205 days.

(21) Appl. No.: 12/454,609

(22) Filed: May 20, 2009

(65) Prior Publication Data

US 2010/0295845 A1 Nov. 25, 2010

(51) Int. Cl.

| | |
|---|---|
| ***G06F 3/038*** | (2013.01) |
| ***G09G 3/30*** | (2006.01) |
| ***G09G 5/00*** | (2006.01) |
| ***G09G 3/36*** | (2006.01) |
| ***H01J 1/62*** | (2006.01) |
| ***H01J 63/04*** | (2006.01) |
| ***G09G 3/32*** | (2006.01) |

(52) U.S. Cl.

CPC ...... *G09G 3/3216* (2013.01); *G09G 2310/0251* (2013.01)

(58) Field of Classification Search

CPC .................... G09G 3/3216; G09G 2310/0205; G09G 2310/021; G09G 2310/0251; G09G 3/2081

USPC ............. 345/76–77, 83–84, 87, 98–100, 204, 345/211, 690, 545; 349/96; 706/20; 347/238; 257/57, 72; 313/500; 365/233.1, 203, 149, 233.12, 145; 326/38; 711/105; 712/214; 359/630

See application file for complete search history.

(56) References Cited

U.S. PATENT DOCUMENTS

| | | | |
|---|---|---|---|
| 6,778,158 | B2 | 8/2004 | Sun |
| 7,079,092 | B2 | 7/2006 | Tanghe et al. |
| 7,183,719 | B2 | 2/2007 | Yang |
| 7,319,446 | B2 | 1/2008 | Oh et al. |
| 7,453,427 | B2 | 11/2008 | Kimura |

(Continued)

FOREIGN PATENT DOCUMENTS

| | | | |
|---|---|---|---|
| JP | WO/2008/139695 | * 11/2008 | ............... G09G 3/36 |
| WO | WO 2004/111988 | 12/2004 | |

OTHER PUBLICATIONS

Co-Pending U.S. Appl. No. 12/454,625, filed May 20, 2009, "Advanced Multi Line Addressing," assigned to the same assignee as the present invention.

(Continued)

*Primary Examiner* — Quan-Zhen Wang
*Assistant Examiner* — Lin Li
(74) *Attorney, Agent, or Firm* — Saile Ackerman LLC; Stephen B. Ackerman

(57) ABSTRACT

A circuit for a flat panel display, capable of displaying images, is provided. The circuit includes an image storage block for storing the images to be displayed, a display and timing controller block controlling the display operation, an image pixel matrix containing a multitude of rows and columns arranged pixel elements. The circuit also includes one or more controlled row driver blocks, one or more controlled column driver blocks, and a pixel pre-charge mechanism for pre-charging the pixel elements employing a back to back pre-charge operation applied to a row and/or column drive activated pixel element display operation. The back to back pre-charge operation signifies that during every other operating sequence a pre-charge operation is replaced by an activated pixel element display operation.

38 Claims, 9 Drawing Sheets

(56) References Cited

U.S. PATENT DOCUMENTS

2003/0217223 A1* 11/2003 Nino et al. .................... 711/105
2004/0160404 A1* 8/2004 Nakajima ............ G09G 3/2011 345/96
2006/0107616 A1* 5/2006 Ratti et al. ...................... 52/750
2006/0214889 A1* 9/2006 Matsumoto .......... G09G 3/3233 345/76
2006/0232612 A1* 10/2006 Tsuge ........................... 345/690
2007/0057628 A1* 3/2007 Kim ..................... G09G 3/3216 313/504
2007/0132679 A1* 6/2007 Guttag ............................ 345/84
2007/0165481 A1* 7/2007 Norris et al. .................. 365/233
2008/0007156 A1* 1/2008 Gibson et al. ................. 313/503
2008/0162869 A1* 7/2008 Kim et al. ..................... 711/216
2008/0211793 A1 9/2008 Ku
2008/0231567 A1* 9/2008 Van de Ven et al. ............ 345/83
2008/0284771 A1* 11/2008 Matsuki ............... G09G 3/3692 345/211
2009/0021455 A1* 1/2009 Miller .................. G09G 3/3216 345/77
2009/0195521 A1* 8/2009 Chen ........................ G09G 3/30 345/204
2009/0327660 A1* 12/2009 Bains et al. ................... 712/214
2010/0118012 A1* 5/2010 Irie et al. ....................... 345/211

OTHER PUBLICATIONS

Co-Pending U.S. Appl. No. 12/455,554, filed Jun. 3, 2009, "Extended Multi Line Address Driving," assigned to the same assignee as the present invention.

Co-Pending U.S. Appl. No. 12/455,527, filed Jun. 3, 2009, "Tagged Multi Line Address Driving," assigned to the same assignee as the present invention.

* cited by examiner

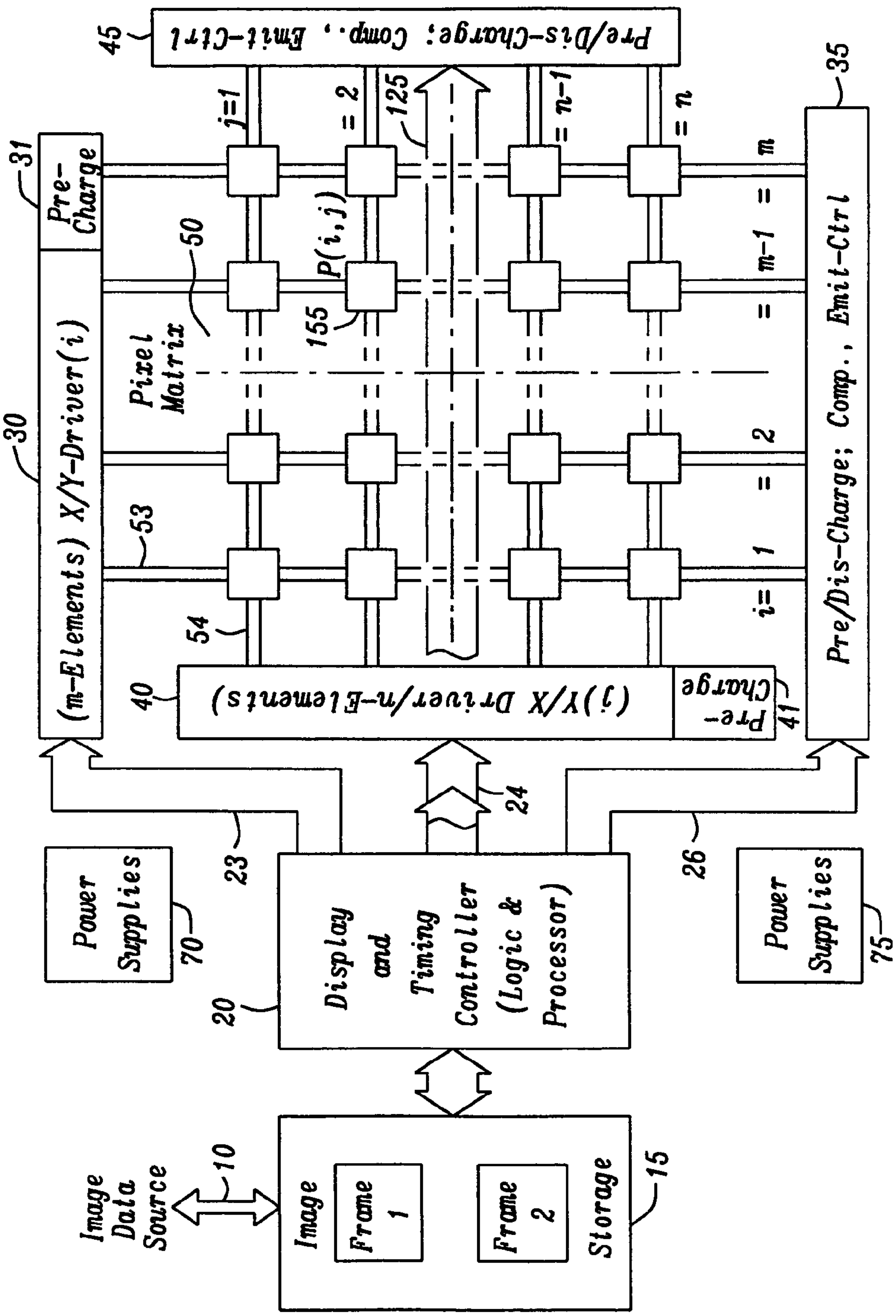
FIG. 1 - Prior Art

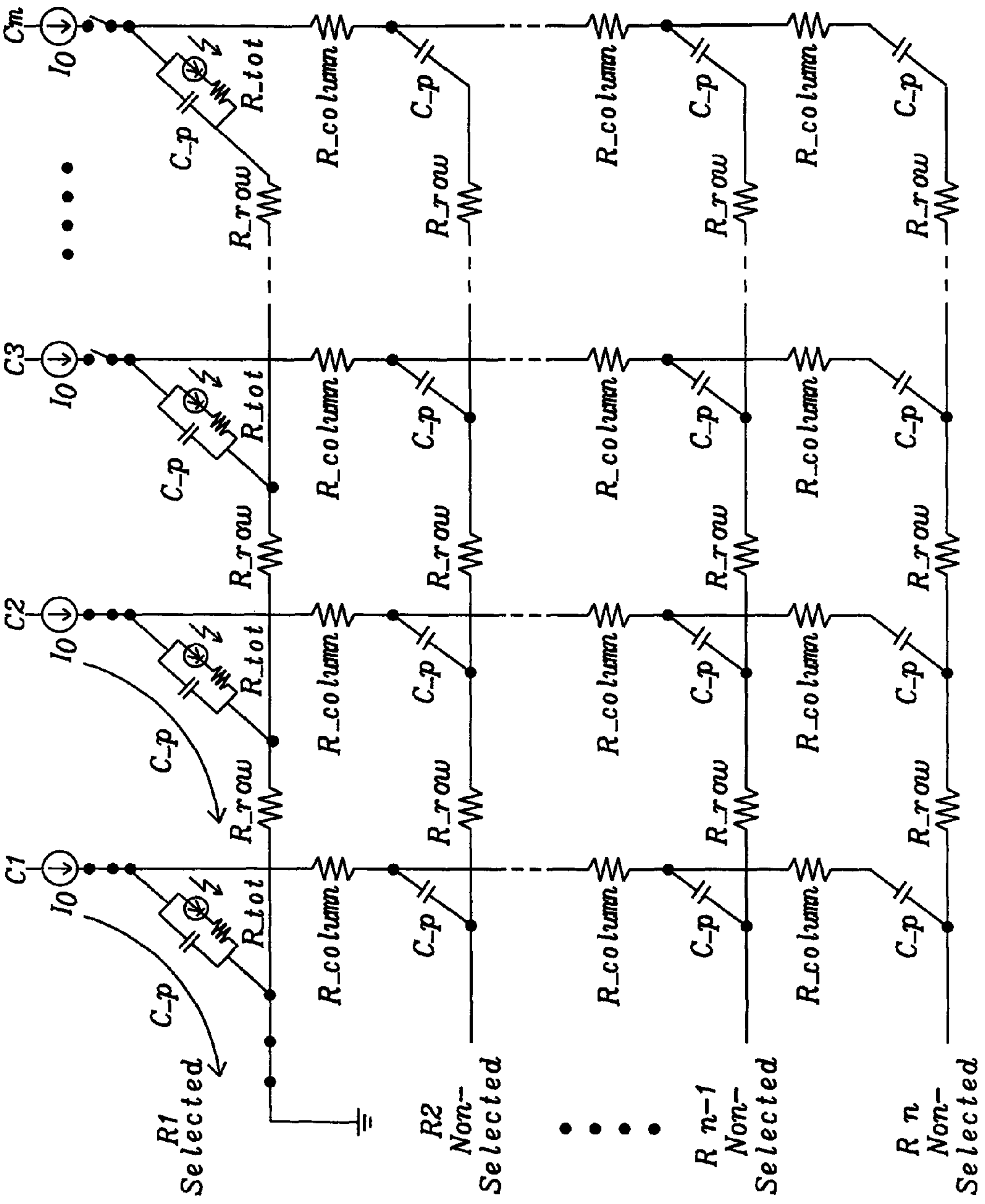
FIG. 2A - Prior Art

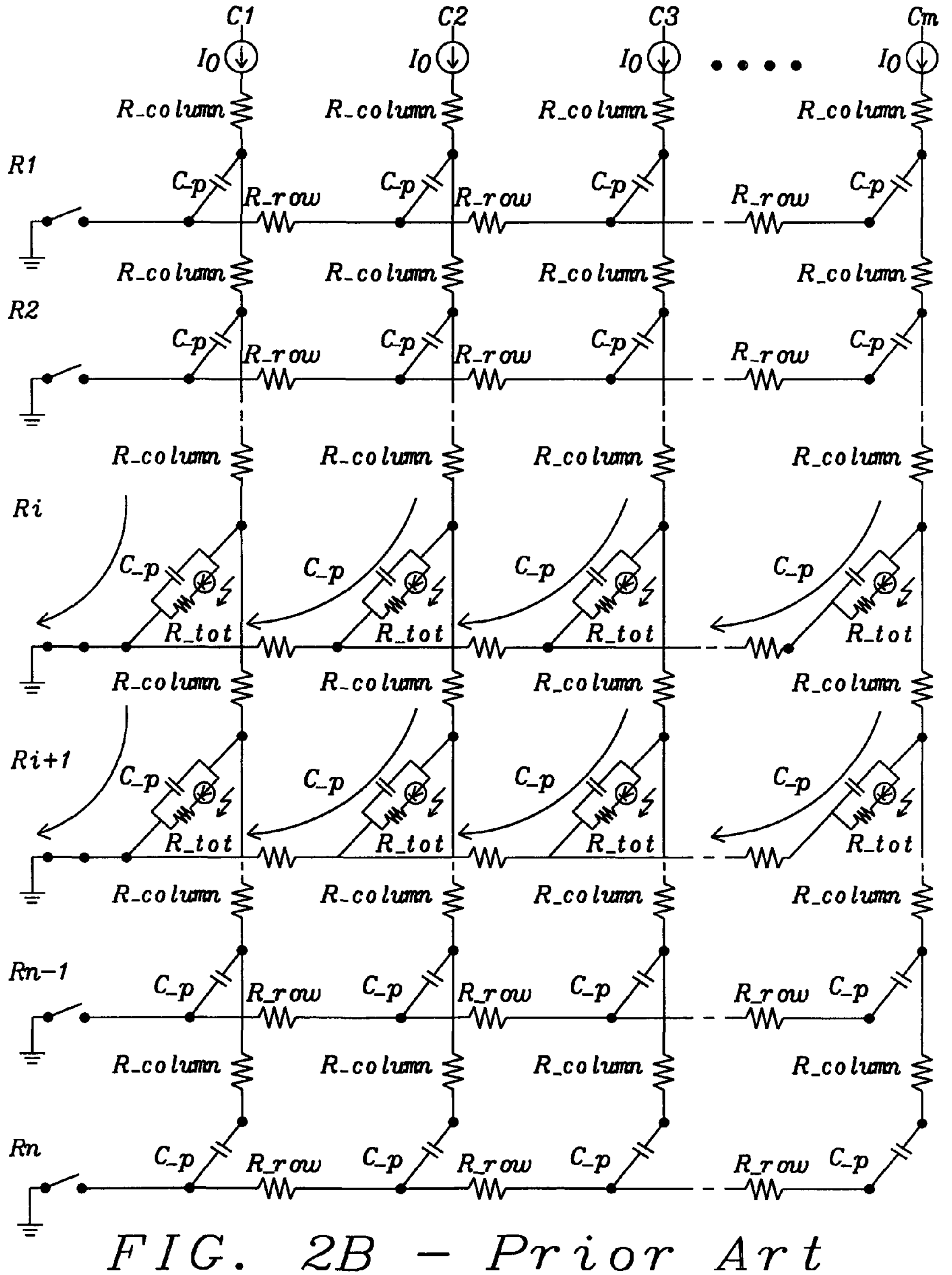
FIG. 2B - Prior Art

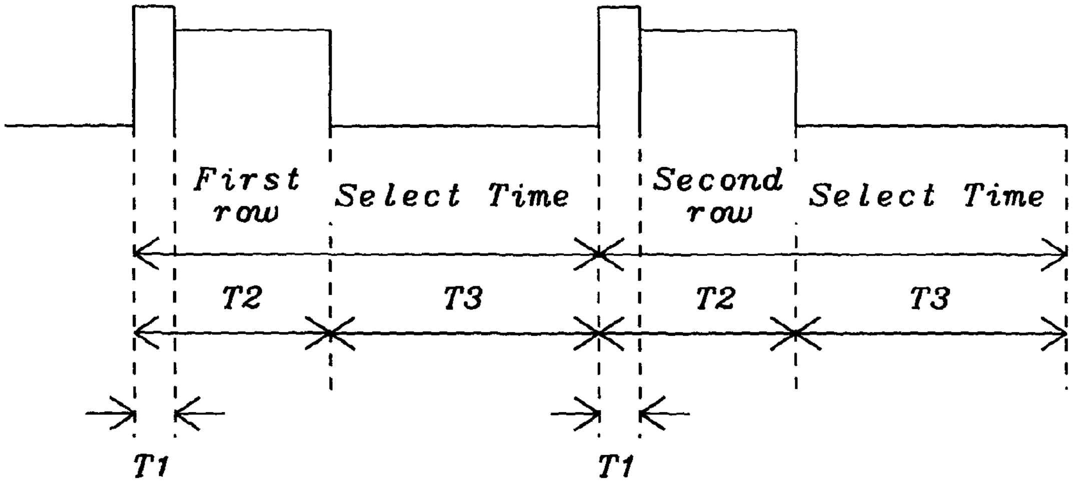
FIG. 3 - Prior Art

BACK TO BACK PRE-CHARGE SCHEME

RELATED APPLICATIONS

This application is related to the following U.S. patent applications:

DS08-014, titled "Advanced Mult Line Addressing", Ser. No. 12/454,625, filing date May 20, 2009

DS08-015, titled "Extended Multi Line Address Driving", Ser. No. 12/455,554, filing date Jun. 3, 2009

DS08-016, titled "Tagged Multi Line Address Driving", Ser. No. 12/455,527, filing date Jun. 3, 2009

The contents of all three of these applications are hereby incorporated by reference in their entirety.

BACKGROUND OF THE INVENTION (1) Field of the Invention

The present invention relates in general to image display devices, display panels, and driving methods thereof implemented within display driver circuits, and particularly to the drive circuitry of matrix large-screen organic light-emitting diode (OLED) displays, especially circuits used in LED drivers manufactured as semiconductor integrated circuits. Even more particularly, this invention relates to a pre-charge method saving power and optimizing performance.

(2) Description of the Prior Art

Recent development trends in modern flexible and versatile telecommunications (including by way of example telephones especially wireless handsets, pagers, mobile and cellular phones especially with cameras, television sets, and electronic news readers also known as 'E-paper') and data processing equipment (including by way of example desktop monitor displays, laptop and notebook computers, printers and copiers, digital calculators, personal digital assistants (PDA), electronic books also known as 'E-book', portable dictionaries and translators, laboratory and medical equipment, Automatic Teller Machines (ATM), and Point of Service/Sales (POS) terminals) as well as in many other home and industrial appliances employing help and information features (including by way of example digital cameras, automatic ovens and washing machines, machine tools and general production resources and tools, electronic watches, intelligent coffee makers and refrigerators, high class car and aircraft cockpit information display systems, high comfort navigators, sound or video recorders and players, and not to forget digital gaming devices and musical instruments) often now feature high quality image displaying capabilities for ease of operation and increasingly utilize high quality displays. These displays, especially if they are high-resolution color matrix displays, enhance human usability by offering easy to use man-machine interfaces, thus playing an important role in customers' acceptance of the equipment.

Such electronic display devices can be the LCD (Liquid Crystal Display) type fabricated in STN (Standard Twisted Nematic) or TFT (Thin Film Transistor) technology needing additional back-lighting, but of late are often also made as LED (Light Emitting Diode) displays in the form of self-luminescent OLED. (Organic LED) and PLED (Polymer LED also named as PolyLED) devices. These latter displays are capable of exhibiting their own luminosity, without extra light sources. OLED technology incorporates organic luminescent materials that, when sandwiched between electrodes (anode, cathode) and subjected to a DC electric current, produce intense light of a variety of colors. PLED devices using polymer materials also do not need additional back-lighting. Hence we will use in the following the terms OLED and PLED mostly in an exchangeable meaning. Similar capability can be achieved with Surface conduction Electron Emitter Displays (SEDs), High Dynamic Range (HDR) displays, Field Emission Displays (FED), and QDLED-Displays making use of Quantum Dot crystals. Currently OLED and PLED displays are commonly used, available in PMOLED (Passive Matrix) OLED and AMOLED (Active Matrix) OLED structure forms, differentiated by their driving methods and circuits. PMOLEDs are much simpler to manufacture than AMOLEDs because there is no TFT substrate for active components needed, and as a result fewer processing steps are required in the manufacturing line. OLEDs and PLEDs are also useful in a variety of applications as discrete light-emitting devices or as active elements for light-emitting arrays or displays, such as Flat-Panel Displays (FPD) of all kind and size. Depending on the types of substrates used for OLED and PLED manufacture, there are various types of implementations: Transparent OLEDs wherein transparent substrates for cathode and anode are used, which because of these transparent components can pass light in both directions and thus are especially useful in head-mounted display devices; Top-emitting OLEDs which use either opaque or reflective substrates, allowing light to be emitted in one direction only, and which are the most used types; Foldable OLEDs using highly flexible substrates, which help to reduce breakage of the display material thus allowing many new applications; and White OLEDs, used to emit white light which is brighter, more uniform and more energy efficient than other materials used for lighting.

As is well known for OLED and PLED displays, optimum performance especially with high-brightness LEDs is achieved only when the LEDs are driven by current sources rather than by voltage sources, the currents of which are delivered by individually controlled display drivers with highly precise current sources directly driving the LED pixels, whereby the LED element of each pixel itself is an electric component with diode characteristics including also parasitic resistances and capacitances. In the PMOLED case no further components are needed to build the picture elements or pixels for the dots of the display matrix. A pixel, by definition, is therefore a single point or unit of an image, whereby its color is to be chosen, for color displays in a real-time programmable way. In monochrome displays a pixel only displays a single color whereby that color is not individually changeable, only for the display on the whole at production time. However in color displays, a pixel is capable to individually change its color and therefore has to include an arrangement of so-called sub-pixels, at least one sub-pixel for each of its elementary color components according to the color dispersion method chosen, as for both, PMOLED and AMOLED devices. In the AMOLED case however the OLED sandwich structures are combined with electronic switches (transistors or diodes, especially Metal-Insulator-Metal (MIM) devices) and separate charge storing elements (capacitors) to form pixels that make up the dots of a modern matrix display. Dots for color displays therefore generally comprise more than one pixel, and thus are made up of sub-pixels emitting for example red, green, blue and of late also white light, which are individually controlled and driven.

Various differently complex sub-pixel circuits have been developed making additional use of several TFT transistors and storage capacitors in order to overcome onerous side-effects of the intrinsic light emissive material of the pixels—such as degradation during lifetime, delayed response times for activation and deactivation of the pixel, and the like. There are two basically different circuit configurations for driving these sub-pixels, namely, the common anode configuration and the common cathode configuration. These configurations differ as to whether the sub-pixels are addressed via a common anode line or addressed via a common cathode line. Accordingly, in the common OLED anode/cathode configuration, the anodes/cathodes of the sub-pixels are electrically connected and addressed in common. Conventional OLED displays typically use the common cathode configuration. In a typical common cathode drive circuit, a current source is arranged between each individual OLED anode and a positive power supply, while the OLED cathodes are electrically connected in common to ground. Consequently, the currents and voltages are not independent of each other, and small voltage variations result in relatively large current variations, influencing the light output of the OLEDs. Furthermore, in the common cathode configuration, the constant current sources are referenced to the positive power supply, so again any small voltage variation will result in a current variation. For all these reasons, the common cathode configuration makes precise control of light emission, which depends upon precise current control, rather difficult. By contrast, in a typical common anode drive circuit, a current source is arranged between each individual OLED cathode and ground, while the OLED anodes are electrically connected in common to a positive power supply. As a result, the current and voltage are completely independent of one another, and small voltage variations do not result in current variations, thereby avoiding the consequence of light output variations. Furthermore, in the common anode configuration, the constant current source is referenced to ground, which does not vary, thereby eliminating current variations due to a variation of its reference. For these reasons again here, the common anode configuration lends itself to a more precise control of light emission needed in large-screen display applications.

With reference to the more elaborate sub-pixel circuits for ON/OFF controlling the organic or polymeric light-emitting cell of each sub-pixel there are the already known two elementary driving methods for PMOLED and AMOLED displays, one is the Passive Matrix (PM) driving method and the other is the Active Matrix (AM) driving method using TFTs. In the PM driving method, anode and cathode electrodes are arranged perpendicular to each other to selectively drive the lines. On the other hand, in the AM driving method, TFTs and a charge storing capacitor are coupled to the pixel electrodes so as to sustain a voltage by the capacity of the capacitor. According to the form of the signals applied to the capacitor to sustain the voltage, the AM driving method can furthermore fundamentally be divided into a voltage programming mode and a current programming mode, whereby of late the current programming mode is preferred as already mentioned above. OLED displays are thus normally operated as current-controlled display devices. Nevertheless, for high-content displays realized as large matrix arrays, a multiplexing mode is also a necessity. In this context, though OLED devices are essentially current-controlled devices, a voltage drive mode is chosen for a short period before the current drive mode is established, which is operating as charge drive for the parasitic internal parallel capacitances of the OLED sub-pixel diodes. The electrical model of a sub-pixel of an OLED consists of a Light Emitting Diode (LED) and the parasitic capacitance modeled by a capacitor in parallel. A sub-pixel thus emits light when current passes through the diode. In a current driving system, the constant current source connects to the sub-pixel to turn it on. This charges up the capacitor linearly. Before the sub-pixel voltage reaches the diode's threshold or forward voltage, there is no current flowing through the diode and the sub-pixel is still OFF. Supply current is consumed only for charging the capacitor during this period. If the capacitance is large the sub-pixel is off for a long time. And it is ON only after the sub-pixel voltage has reached the threshold voltage level. These parasitic capacitances may become rather large depending on the size of the sub-pixel. The time of their charging-up until reaching the sub-pixel diode's threshold voltage is thus referred to as pre-charge period. Therefore, for a multiplexed matrix OLED display, both a current drive and a voltage drive are required. Because larger OLED displays exhibit these high capacitance characteristics, a normally substantial pre-charge current is injected voltage driven to bring the diode up to near its operating current prior to enabling the diode. Thus, time and power are not wasted for charging and discharging the relatively high capacitance that is inherent to large OLED display sub-pixels and the lifetime of the diodes are prolonged because the diodes are not required to swing the full voltage range during each cycle. Consequently having driven the OLED sub-pixel by pre-charging into the constant current driven and linear time function voltage rising region a Pulse Width Modulation (PWM) brightness control method for OLED sub-pixels is now feasible with high accuracy. The longer the constant current is applied, the brighter the OLED sub-pixel shines.

Performance problems with sub-pixel circuits have included degradation problems of the luminous material; non-uniformity problems due to deviations of the threshold voltages of driving TFTs and its electron mobility; problems in securing the time for charging the load of the data lines since only small currents are used in controlling the OLED element, leading again to pre-charge method and circuit provisions; problems of current leakage through TFTs depending on neighbor pixel states, accordingly problems where images with desired gray levels are not displayed because of the current leakage; and problems with unnecessary power consumption since the current caused by pre-charge voltages is consecutively leaked into the pixel circuit while the pre-charge operation is not being performed. All this makes it understandable that rather sophisticated sub-pixel circuits in AM displays have evolved necessitating also rather elaborate control signal schemes for even multiple control signal lines for each sub-pixel. Modern display driver integrated circuit chips do contain all needed components for driving said such sub-pixel circuits, which are part of the OLED display matrix itself, however in the AM case only.

Generally the PM and AM OLED technology provide bright, vivid colors in high resolution and at wide viewing angles, additionally also exhibiting a high response speed in large but nevertheless slim FPD devices. OLED devices' technological advantages of high brightness and high luminance efficiency, short response time and wide visual angle, together with its power saving operation and wide temperature tolerance, have established unequaled features for large screens, offering high resolution displays with up to several million pixels and diagonal sizes up to 60 inches. However, OLED technology in very large-screen or huge-screen display applications is currently still on its way into the mass market; examples include huge time-table displays at train stations, in airports, or at harbors, or displays for large marketing advertisements and mass-public informational purposes including those displaying share prices in stock exchanges, and huge indoor or even outdoor stadium displays. OLED color displays are expected to offer substantial advantages compared to other technologies currently in common use: wide dynamic range of colors, high contrast, superior light intensity and lesser depending on various external environmental factors including ambient light, humidity, and temperature. For example, outdoor displays are required to produce more white color contrast under daylight conditions and during the night show more black color contrast. Accordingly, light output must be greater in bright sunlight and lower during darker, inclement weather conditions. The intensity of the light emission produced by an OLED pixel is directly proportional to the amount of current driving it. Therefore, the more light output needed, the more current has to be fed to the pixels which on the other hand is detrimental to the lifetime of the pixels.

Another important consideration in large-screen and huge-screen display applications using OLED technology is the pure physical size of the pixel. A larger area for the self-luminous emission area is more visible and lends itself to better achieving the required wide dynamic range of colors, contrast, and light intensity. However, a rather unrequested consequence of a larger pixel area is the relatively high inherent capacitance of the larger OLED pixel as compared to smaller OLED pixel structures. Due to this higher inherent capacitance, during pixel ON/OFF switching operations, an elevated amount of charge time is required to reach the correct OLED device working voltage. This augmented charge time thus limits the ON/OFF rate of the device and thus may adversely affect also overall display brightness and performance. Therefore a multitude of OLED pre-charge circuits and methods have been developed and integrated into existing FPD display driver circuitry to help overcome the detrimental effects of parasitic capacitance characteristics of OLEDs especially within large graphics FPDs.

FIG. 1 Prior Art now shows as circuit schematics the drawing for an FPD, wherein a matrix display device converts electric signals processed by an information processing device into an image, visible on an FPD screen. Numerous circuits for complete FPDs exist as prior art in many variants, they shall be summarized here in form of an exemplary circuit shown as FIG. 1 Prior Art.

From FIG. 1 Prior Art can be recognized an Image Data Source 10 being connected via a bi-directional data bus and feeding its image data stream normally comprising a multitude of image frames into an Image Storage 15 unit, capable of storing multiple image frames, whereby every image frame contains in general successive image data from said incoming image data stream. That Image Storage 15 unit is again bi-directionally connected to a Display & Timing Controller 20 unit, comprising inter alia data and/or signal Logic circuits and a data and/or signal Processor.

Display & Timing Controller 20 unit then prepares and conditions those image frame data as they come in from the Image Storage 15 unit, and delivers these data now in an appropriately transformed manner via image data and control signal bus systems 23, 24, 25, and 26 to the respective, closely display matrix adapted electronic driver units 30, 35, 40, and 45 of the FPD's literal Pixel Matrix 50. The Pixel Matrix 50 of the FPD includes a plurality of X-Lines 53 (i=1, 2 . . . m−1, m) extended along a first direction of an array substrate serving as material medium for the screen, a plurality of Y-Lines 54 (j=1, 2 . . . n−1, n) extended along a second direction of the array substrate that is substantially perpendicular to the first direction, and a plurality of sub-pixel 55 elements P(i, j) each electrically connected to one of the X-Lines and one of the Y-Lines. In this manner a Cartesian X-Y system of coordinates is established, mathematically spoken. From the terminology of mathematics here also the designations used are derived. Each i, j-indexed pair of X-Y coordinates thus uniquely identifies a sub-pixel element P(i, j) within 55. Many other terminologies in the context of FPD designations are in wide-spread use however, depending on the point of view (POV) taken in explaining the configuration. A possible interchange of the sequence X-Y into Y-X comes from the fact, that the designation of the axes is freely interchangeable with its coordinated line designations, in case of a PM-structure these axes are even functionally interchangeable, because the construction of PMOLED pixels is fully symmetrical; besides polarity of the OLEDs only, where anode and cathode are interchanged which can easily be accounted for by inversely adapted voltage polarities however. Most closely related are the terms Rows and Columns for the Y/X- and X/Y-Lines respectively, which use directly the mathematical matrix designations for these parts. Using topological terminology leads to Horizontal and Vertical, which is mapped to Y/X- and X/Y-Lines again. From an FPD operational POV the Y- and X-Lines are called Scan-Lines and Data-Lines respectively, which is a rather often used terminology in fact. This operational POV sees an FPD as an image display device including Data-Lines for transmitting image data voltages representing the image signals, Scan-Lines for transmitting appropriate multiplex select signals scanning the matrix, with sub-pixel circuits for each image point coupled directly to those Data- and Scan-Lines. An even more technical aspect leads to the electrical POV valid however for AM-displays only, namely Gate-Lines and Source-Lines stemming from the utilized TFT-switching transistors in AM sub-pixel circuits. This electrical POV sees a Scan-Driver driving an AM-display device having a plurality of Gate-Lines transferring multiplex scan signals, and a Data-Driver driving a plurality of Source-Lines transferring image data signals. Also from the technical or electrical POV often in use for PM-displays are the terms Anode and Cathode, reminding directly of the OLED's diode function. Thus the designations Anode- and Cathode-Lines are used, as well as Anode- and Cathode-Drivers. All these designations are used in the case of the dynamic operation of multiplexed FPDs. There is however also a static, non-multiplexed operation possible, using fewer pixels only, then the Y/X- and X/Y-Lines are called Segment-Lines and Common-Lines or vice-versa, which becomes evident from the arrangements for simple displays, e.g. the commonly used 7-segment cipher displays. It is furthermore obvious that in case of a PMOLED display it is arbitrary which lines are labelled Row lines and which Column lines, Rows and Columns can be used interchangeably. From a methodological POV, the X/Y- and Y/X-terminology is avoided if not only strictly symmetrical issues are concerned, which is seldom the case, also for PM-arrays; the Row/Column or Scan/Data designations are easier to understand and remember, the Gate/Source naming is usable for AM-structures only, and even there it is not simply applicable any more because of the complex pixel-circuits with diodes as switching elements etc., the Anode/Cathode terminology is popular instead.

Consequently the display matrix adapted electronic driver units 30, 35, 40, and 45 bear the following names for unit 30: X/Y-Driver or Data-Driver or Source-Driver or Matrix-Column- or Horizontal-Drive-circuit which is driving the vertically running X/Y-Lines, Data-, Source-, or Column-Lines. Unit 40 correspondingly becomes designated as Y/X-Driver or Scan-Driver or Gate-Driver or Matrix-Row- or Vertical-Drive-circuit again now driving the horizontally running Y/X-Lines, Scan-, Gate-, or Row-Lines. Unit 35 is a possible coordinated driver circuit usually performing auxiliary functions such as pre-charge or discharge operations, compensation signal adding or secondary emit control functions for its attributed X/Y-Driver or Data-Driver or Source-Driver or Matrix-Column-circuit 30. In the same manner is unit 45 a possible coordinated driver circuit also performing auxiliary functions such as pre-charge or discharge operations, compensation signal adding or secondary emit control functions for its attributed Y/X-Driver or Scan-Driver or Gate-Driver or Matrix-Row-circuit 40. It shall especially be mentioned that all these functions may also be incorporated into the main driver circuits 30 and 40 as shown in FIG. 1 Prior Art for the corresponding pre-charge sections 31 and 41 respectively. From this can then be deduced that all the horizontally 54 and vertically 53 running data, select, scan, and control signals 53, 54 leading to their related sub-pixel circuits within 55 are possibly bundled in signal bus lines comprising multiple wires. Equally should be mentioned that the display matrix area may be separated into multiple sub-areas used for displaying only partial frames, so-called sub-frames, together with an appropriate adaptation of corresponding driver circuits and data and control signals. In order to be able to fulfill all the necessary tasks the mentioned display driver circuits or units 30, 35, 40, and 45 may contain needed sub components such as memory registers, shift-registers, switches, multiplexers, voltage level shifter circuits, programmable voltage and/or current sources and/or sinks, and additional clocks or timers. FIG. 1 Prior Art also unveils the existence of several power supplies 70 and 75 intended for generating and/or delivering various voltages and currents for being used as e.g. Row ON/OFF Voltage Source, Column ON/OFF Voltage Source, or as Column Compliance Voltage Source, or as Pre/Discharge Source, or the like. The generated voltages or currents are used for OLED pixel operations like applying the Pre-charge Pulse, setting Display Sub-pixel ON/OFF or accelerating the pixel OFF responses by injecting an extra Discharge Pulse. During a multiplexed image display operation the Scan/Row-Lines 54 are activated in sequence. When one of the Scan/Row-Lines 54 is activated, a data signal is applied to the selected sub-pixel elements in 55 through the Data/Column-Lines 53, so that the respective sub-pixel elements in 55 are electrically activated. When these selected sub-pixel elements in 55 are electrically activated, normally all additionally estimated necessary or needed auxiliary signals are appropriately synthesized defining the drive or data signals for all the sub-pixel elements in 55 thus correctly controlling the entire display pixel 55 made up of different sub-pixels. As a result, an optical activity is enabled to display the desired image. The time period during which first through last Scan/Row lines are activated is referred to as one frame, in the case only of regular single sequential scanning operations however.

With FIG. 2A Prior Art a more detailed view onto the Pixel Matrix 50 from FIG. 1 Prior Art of an FPD with PMOLED display matrix is depicted, schematizing the current driving functions of the Data/Column 30 drivers and the scanning operations of the Scan/Row drivers 40 by showing switched constant current sources as well as simple switches instead for each Column and Row respectively. The OLED pixels on the other hand are represented together with their parasitic elements total resistance R_tot and parallel capacitance C_p, just the same as the Row and Column wires with their loss resistances R_row and R_column. No other components are comprised in the passive matrix diode display array. As operating example is shown a state with Row R1 selected, i.e. its according switch is closed and Columns C1 and C2 are ON with all other Columns OFF, i.e. the related switches are closed only in the first two columns and thus only there currents can flow, and if the threshold voltages of the two switched ON diodes are surpassed after the parasitic capacitances of these two diodes are sufficiently charged-up, the OLED pixels (1,1) and (1,2) are shining bright. From this description and drawing the need for pre-charging OLED displays is easy to understand, if fast responses are required. The influence of all the other parasitic and lossy elements in PMOLED displays is also clearly illustrated.

Several differing addressing schemes are used for individual addressing of the display pixels 55 of a display matrix, whereby in fact the addressing designates the selection or activation of single sub-pixels within a certain OLED pixel 55 dot. In general the individual sub-pixels in a matrix row are activated or selected by a Matrix Row signal formerly designated also as Scan/Row signals for a Row Select Time, whereas the image data to be displayed are supplied via individual Matrix Column or Data/Column signal lines. The most common addressing scheme formerly used mainly for LCD devices is the so called Alt & Pleshko driving scheme. Hereby each Matrix Row is activated separately. At the time the respective Matrix Row is selected or scanned the required image Data signals are applied to the Matrix Column via their Data/Column lines. So each display sub-pixel in the selected Matrix Row will show its programmed brightness as controlled by appropriate PWM Data signals as already explained farther above, which means each dot displays its correct color in case of color FPDs. After all dots within one Matrix Row have been completely activated, the next Matrix Row will be selected until all Matrix Rows of the display have been selected one time to display a complete image frame. Thereby, as already mentioned above a frame is defined as the time it takes to select all Matrix Rows of the FPD in case of Alt & Pleshko and thus driving every Matrix Row exactly once.

These addressing schemes did always address only single lines or rows of an FPD matrix at a time, applying ordinary multiplexing techniques. They are therefore subsumed and known as Single Line Addressing (SLA) techniques. More sophisticated addressing or driving schemes are the Multiple Line Addressing schemes (MLA), also known as Multiple Row Addressing (MRA). Groups of Matrix Lines or Rows are simultaneously driven and encoded image information is applied to Matrix Columns as Data/Column signals. For example calculation algorithms are employed, which with the help of a set of orthogonal functions compute a function for the Data signals for driving the corresponding Matrix Column. Thus from said set of orthogonal functions using an appropriate calculation rule an encoding is obtained, which results in a function for the Matrix Column or Data/Column signal voltage/current. This encoding is applied to gray levels for pixels or to color intensities of sub-pixels and the like. By using this encoding rule for driving the Matrix Column, a voltage/current level according to the orthogonal function calculation result is selected out of a plurality of partial Matrix Column voltage/current level values, which plurality must comprise one more voltage/current level than the number of simultaneously driven Matrix Rows or Lines in the currently handled group of simultaneously driven Matrix Rows or Lines is comprising. Said calculated Data/Column voltage/current signal is now being applied to the corresponding Matrix Column so that the corresponding OLED sub-pixels are lit corresponding to the Image Data that are supplied from an Image Storage memory. In order to display fine grained luminance or brightness scales the already mentioned PWM method can be used. This method can then be combined either with Alt & Pleshko driving or MLA schemes. Modern MLA schemes have been further expanded and continuously developed into the Consecutive MLA scheme (CMLA) a rather complex matrix decomposition method combining MLA and Single Line Addressing (SLA) techniques.

FIG. 2B Prior Art shall now illustrate a simple MLA operation, looking back onto the already explained passive OLED pixel matrix from FIG. 2A Prior Art. Two lines are taken as example here, which are addressed together, namely Row Rj and Row Rj+1. The corresponding Scan/Row drivers are again replaced here by simple switches, which are closed if the lines are selected. The individual Data/Column drivers are represented however by controlled current sources, therefore no switches are needed here. As can be seen from the drawing, all the diodes within rows Rj and Rj+1 are connected to these controlled current sources and are therefore driven two in parallel in each column, that is in the example chosen here. From every Data/Column current source in MLA FPD driver circuits there is always the sum of currents drawn for all the OLEDs selected in multiple lines. Supplying all the diodes in the selected rows together at the same time thus always makes necessary exactly that same multiple of the current which would drive only one diode to the same brightness, the multiple according to the number of lines used in the MLA scheme. Additionally all the MLA schemes have to take into account the provisions to be made for needed pre-charging methods, which as a matter of course have also to be applied here, however considering the multiple demand of current just in the same way as for the Data/Column driving currents. What also can be understood easily from here, is the fact that all the OLEDs from each of the lines in an MLA scheme which are being driven simultaneously together can only receive identical contents, because of their identical Data/Column driving currents they receive.

As an example for a standard prior art pixel driving scheme FIG. 3 Prior Art exhibits the signal run of the Data/Column-Line 53 sub-pixel brightness driving signal complete with its superimposed pre-charge control current/voltage signal. As already explained above for optimum performance each OLED sub-pixel in an OLED display has to be pre-charged (using a voltage or a current) to the threshold or forward voltage of the intrinsic diode in order that a brightness PWM type driven waveform may have a linear (or near linear) current to light conversion formula. Therefore during a normal driving scheme each active OLED sub-pixel in 55 is pre-charged (during time period T1), driven at a specific brightness (during varying time periods T2) using PWM techniques and discharged (during varying time periods T3), all this is done on a row by row basis.

It still remains important to bear in mind:

all these pre-charge operations, which are crucial for the driving operations for a quality image display augment the overall power consumption and thus also the operating temperature and hence are detrimental for the life-time of the entire FPD. Therefore various other methods renouncing use of extra pre-charging operations have been tried, e.g. by correction of scales and imposing additional linearization tables for brightness control of OLED pixels. Success of all these methods may be rated at least as questionable.

As can already be seen from the above the goal to both get the benefits of pre-charge driving and enhanced brightness control of OLED display pixels and at the same time limit power consumption and augment life-time of the whole FPD product is not easy to attain, a multitude of charge recycling and charge sharing techniques have been attempted with varying success given the surplus expenses needed.

A variety of solutions is found in the prior art for controlling pre-charge operations in an attempt to simultaneously reach the two competing goals namely reaching high accuracy for OLED displays' brightness control and low power consumption and effectiveness in continuous operation. Nevertheless, additional improvements in both fields are desired and continued improvements in these areas are needed. It is therefore a challenge for the designer of such circuits to achieve an even higher accuracy in OLED pixel brightness control and also a more power economical solution which also furnishes a better life-time. There are various patents referring to such solutions.

U.S. Pat. No. (6,778,158 to Sun, Wein-Town) presents a pre-charging display apparatus. By adding a set of the pre-charging switch resistors, a pre-charging control transistor, and a pre-charging control signal, and because the pre-charging control transistor is OFF when the set of the pre-charging switch transistors are set to ON by the pre-charging control signal, the common capacitor on the common line of the matrix panel (or the inverse electrode of the color filter panel) can transmit its stored charges to data lines to pre-charge the data lines. Therefore the charging condition inside the pixels can be improved. Moreover, by using the charges that are stored in the data lines and are inverse to the ones in the common capacitor to help the inversion of the voltage polarity of the common voltage, power consumption needed to charge the data lines and the electrodes of the common voltage can be saved, so as to further significantly save the power consumption of the panel and also improve the rising time delay and the falling time delay of the common voltage.

U.S. Pat. No. (7,079,092 to Tanghe et al.) discloses an Organic Light-Emitting Diode (OLED) pre-charge circuit for use in a common anode large-screen display comprising a pre-charge circuit integrated within the drive circuitry of a common anode, passive matrix, large-screen organic light-emitting diode (OLED) display device for overcoming the inherent capacitance characteristics C.sub.OLED of the OLED devices therein. More specifically, a first pre-charge circuit includes a MOSFET device integrated within the normal drive circuitry for applying a pre-charge voltage to the cathode of a given OLED device just prior to the desired "on" time, thereby overcoming C.sub.OLED rapidly. A second pre-charge circuit integrates within the normal drive circuitry a method of connecting the anode of a given OLED device to a positive voltage while concurrently connecting the cathode to ground just prior to the desired on time, thereby overcoming C.sub.OLED rapidly. A third pre-charge circuit includes an additional current source for supplying current over and above the normal operating current, which is activated just prior to the desired on time, thereby overcoming C.sub.OLED rapidly. Finally, in a fourth pre-charge circuit, a single current source is used that supplies a high current value just prior to the desired on time. Once the capacitor is charged, the output of this current source rapidly drops to the normal constant operating current.

U.S. Pat. No. (7,319,446 to Oh et al.) teaches an Organic electroluminescent display device and driving method thereof, which includes a gate line receiving a gate signal, a data line crossing the gate line, the data line receiving a data signal, a switching thin film transistor switching the data signal according to the gate signal, a driving thin film transistor connected to the switching thin film transistor and receiving the data signal, a power line supplying a current to the driving thin film transistor, an organic electroluminescent diode connected to the driving thin film transistor, and a pre-charge element inputting a pre-charge voltage to the data line before the data line receives the data signal.

U.S. Pat. No. (7,453,427 to Kimura) describes Semiconductor device and driving method thereof in which a signal current can be written quickly in a current source circuit of a current input type. A signal current is written after performing a pre-charge operation, thus the writing is performed quickly. In the pre-charge operation, a current is supplied to a plurality of circuits. The current size is set according to the number of the circuits to be supplied the current, which means the steady state can be obtained quickly. Note that a current may be supplied to a circuit other than the one to be input a signal in the pre-charge operation.

In the prior art, there are different technical approaches to achieve the goal of a lower power consumption of the integrated display driver circuits. However these approaches use often solutions, which are somewhat technically complex and therefore also expensive in production. It would therefore be advantageous to reduce the expenses in both areas.

SUMMARY OF THE INVENTION

A principal object of the present invention is to realize a system for an FPD with lower power consumption.

Another principal object of the present invention is to provide an effective and very manufacturable method for pre-charging OLED pixels implemented as an FPD driver integrated circuit (IC) for MOSFET technology.

A further principal object of the present invention is to allow a simpler pre-charge operation to be used without degrading its basic performance on FPD quality.

Further another object of the present invention is to give a method for reducing the operating temperature of FPD drivers.

Still another object of the present invention is to give a method whereby the lifetime expectations for FPD devices are enhanced.

Another still further object of the present invention is to use a simpler design for FPD drivers.

Still another object of the present invention is to simplify the design of the power supplies within FPD driver circuits.

Also still another object of the present invention is to simplify the production of FPD devices.

Further a still other object of the present invention is to make better use of battery power resources in portable devices using FPDs.

Another further object of the present invention is to allow for an economically manufacture of very large FPD devices.

These objects are achieved by a new circuit capable of realizing a flat panel display capable to display images, comprising an image storage and/or processing block for said images to be displayed made up of appropriate image data; a display and timing controller block controlling said display operation; an image pixel matrix containing a multitude of in rows and columns arranged pixel elements; one or more controlled row driver blocks; one or more controlled column driver blocks; and a sequentially operating pixel pre-charge mechanism for pre-charging said pixel elements employing a back to back pre-charge operation applied to a row and/or column drive activated sequential pixel element display operation, whereby said back to back pre-charge operation signifies that during every other operating sequence a pre-charge operation is replaced by an immediately following activated sequential pixel element display operation.

In accordance with the objects of this invention the new circuit is described more generally by a circuit realizing a flat panel display capable to display images, comprising an image storage and/or processing means; a display and timing controller means; an image displaying means containing a multitude of in rows and columns arranged pixel elements; one or more row controlling means; one or more column controlling means; and a sequentially operating pixel pre-charge mechanism for pre-charging said pixel elements employing a back to back pre-charge operation applied to an activated sequential pixel element display operation activated by said row and/or column controlling means, whereby said back to back pre-charge operation signifies that during every other sequence a pre-charge operation is replaced by an immediately following activated sequential pixel element display operation.

Also in accordance with the objects of this invention a new method is described, capable of implementing a power saving flat panel display driver pre-charge algorithm, comprising: providing a flat panel display with a plurality of selectable pixel elements arranged in an array of orthogonally oriented rows and columns; providing according row and column driver circuits for said selectable pixel elements; operating said row driver circuits as multiplexed scan drivers and said column driver circuits as image data drivers; scanning sequentially said selectable display pixel elements selecting row by row and thereby activating each column data driver for accordingly selected rows; driving firstly for each selected row columnwise all said selected pixel elements activated by a pre-charge impulse followed by the related pixel element data drive impulse; driving secondly for each selected row columnwise all said same selected pixel elements directly activated by an immediately followed pixel element data drive impulse, thus the next image data are following back to back the preceding data drive impulse avoiding said pre-charge operation completely; and repeating said driving and scanning steps continuously until all rows are being operated upon.

Finally in accordance with the objects of this invention a method is described, capable of implementing a back to back pre-charge operation for flat panel displays comprising: providing an image storage and/or processing means; providing a display and timing controller means; providing an image displaying means containing a multitude of in pixel rows and in pixel columns arranged pixel elements; providing one or more pixel row controlling means; providing one or more pixel column controlling means; providing a sequentially operating pixel pre-charge mechanism for pre-charging said pixel elements; fetching an image from said image storage and/or processing means for appropriate operations employing said row and/or column controlling means; activating a sequential pixel element data display operation for a certain row employing the row and/or column controlling means; applying a pre-charge operation immediately before each activated pixel element data display operation for every pixel element from each column during a first row oriented sequence of pixel activations; looping back to previous step until the complete number of pixels in that first row oriented sequence of pixel activations has been activated; replacing said pre-charge operation by an immediately following activated pixel element data display operation for every pixel element from each column during a second row oriented sequence of pixel activations thus writing image data back to back into identical pixels avoiding the pre-charge operation completely; looping back to previous step until the complete number of pixels in that second row oriented sequence of activations has been activated; looping back to step ‘activating’ choosing another row until the complete number of rows has been operated upon; looping back to step ‘fetching’ fetching the next image until all images from within the image storage and/or processing means have been operated upon.

BRIEF DESCRIPTION OF THE DRAWINGS

In the accompanying drawings forming a material part of this description, the details describing a typical embodiment of the invention are shown:

FIG. 1 Prior Art exhibits the electrical schematics of a typical display driver and control circuit complete with OLED pixel array or matrix having model character as an exemplary embodiment for an FPD according to this invention proposing a new pre-charging technique.

FIG. 2A Prior Art demonstrates the operation of a passive matrix circuit in a schematized way, however considering OLEDs with parasitic elements and matrix structures with losses.

FIG. 2B Prior Art illustrates the operation of MLA schemes within a passive matrix OLED circuit comparable to the schematics of FIG. 2A Prior Art.

FIG. 3 Prior Art shows an example for a standard prior art pixel driving scheme used with FPD devices from FIG. 1 Prior Art displaying the signal run of the Data/Column-Line signal complete with its superimposed pre-charge control current signal in two adjacent time periods for subsequent display matrix rows.

DESCRIPTION OF THE PREFERRED EMBODIMENTS

Figure 4:
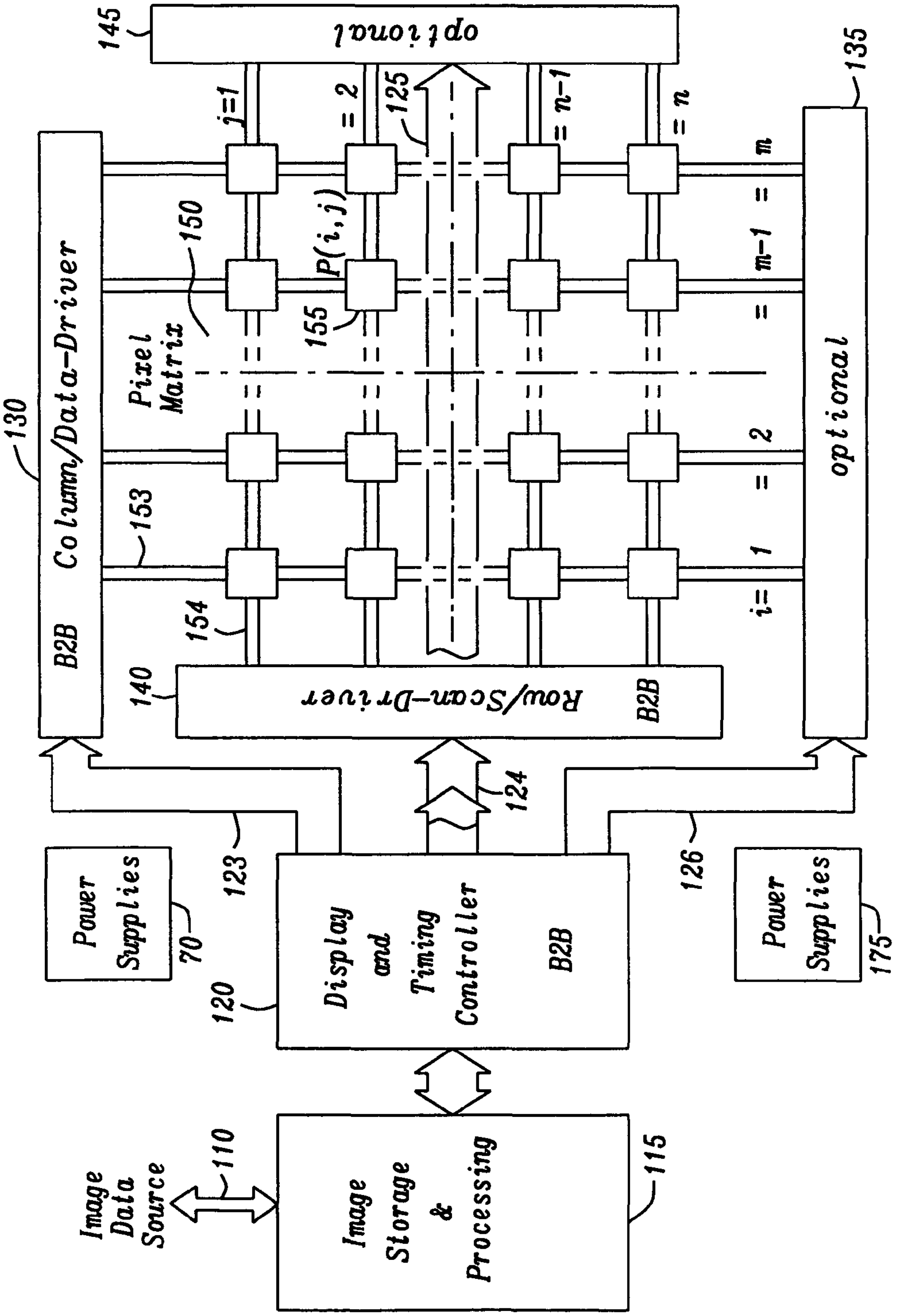
FIG. 4 illustrates by the help of modified electrical schematics another exemplary embodiment for a new FPD device, which incorporates new driver circuits employing the new "Back to Back Pre-charge Scheme" according to this invention proposing a new simplified technique.

The preferred embodiments disclose novel realizations for display driver circuits for FPDs solving the problem of unwanted elevated power consumption by additional OLED display pixel pre-charge operations described here by one exemplary showcase circuit of an FPD and especially by its new method of operation. As already explained above there is a large variety of circuits usable for FPDs and their driver circuits. They all have in common that they comprise some standard components in varying configurations such as an Image Storage block, a Display & Timing Controller block, a Pixel Matrix normally set-up as a rectangular X-Y array of equally spaced OLED Pixels forming the display screen area together with their needed corresponding X/Y-Driver and Y/X-Driver circuits as shown in FIG. 4. Various means for Power Supply are also included as shown.

Contemplating now FIG. 4, wherein "Back to Back (B2B) Pre-charge Scheme" modified electrical schematics exemplifying an FPD device according to this invention are depicted, and wherefrom can be recognized an Image Data Source 110 being connected via a bidirectional data bus and feeding its image data stream normally comprising a multitude of image frames into an Image Storage & Processing 115 unit, capable of storing at least one image frame, whereby every image frame contains in general successive image data from the incoming image data stream. That Image Storage & Processing 115 unit is again bi-directionally connected to a B2B Display & Timing Controller 120 unit, comprising inter alia data and/or signal Logic circuits and data and/or signal Processor capabilities, whereby all Processor units may be implemented e.g. in form of a Digital Signal Processor (DSP) and/or any other general purpose Processor with Central Processing Unit (CPU) and normal Random Access Memory (RAM) and/or Read Only Memory (ROM) modules or even additionally equipped with special Electrical Programmable (EP)-ROM or other One Time Programming (OTP) memory modules. As Processor may also be understood every other device capable to resolve the required processing tasks like finite state machines, logical networks and sequencers, or other dedicated hardware such as ASIC (Application Specific Integrated Circuit) or FPGA (Field Programmable Gate Array) devices and timers. The B2B Display & Timing Controller 120 unit is then preparing and conditioning those image frame data as they come in from the Image Storage & Processing 115 unit and is delivering these data now in an appropriately transformed manner via image data and control signal bus systems 123, 124, 125, and 126 to the respective, closely display matrix adapted electronic B2B driver units 130, 135, 140, and 145 of the FPD's literal Pixel Matrix 150 (of size m×n). The Pixel Matrix 150 of the FPD includes a plurality of X-Lines 153 (i=1, 2 . . . m−1, m) extended along a first direction of an array substrate serving as material medium for the screen, a plurality of Y-Lines 154 (j=1, 2 . . . n−1, n) extended along a second direction of the array substrate that is substantially perpendicular to the first direction, and a plurality of pixel or sub-pixel 155 elements P(i, j) each electrically connected to one of the X-Lines and one of the Y-Lines. In this manner a Cartesian X-Y system of coordinates is established, thus making up the OLED screen area of size (m×n). As far as the B2B driver units 130, 135, 140, and 145 are concerned, these must be capable to implement "Back to Back Pre-Charge Scheme" specific requirements, such as to generate image Data/Column 130 pulses with or without immediately anteceding pre-charge impulses for each pixel or to drive multiple Scan Rows 140 at the same time, therefore named here B2B Scan/Row-Driver 140. The corresponding Data/Column-Driver 130 further on has to modulate the driven pixel or sub-pixel currents and PWM image data according to B2B results and is designated as B2B Column/Data-Driver 130. Additional functions like age compensating and discharging OLED pixels may also be implemented by these drivers. It shall also be mentioned that driver circuits 135 and 145 together with their data busses 125 and 126 may be optional. From this can then be deduced that all the horizontally 154 and vertically 153 running data, select, scan, and control signals 153, 154 leading to their related sub-pixel circuits within 155 are possibly bundled in signal bus lines comprising multiple wires. In order to being able to fulfill all the necessary tasks the mentioned display driver circuits or units 130, 135, 140, and 145 may also contain needed sub components such as memory registers, shift-registers, switches, multiplexers, voltage level shifter circuits, programmable voltage and/or current sources and/or sinks, and additional clocks or timers. Especially also pixel and sub-pixel pre-charge facilities shall be counted in here. Qualifying this circuit for the "Back to Back Pre-charge Scheme" operations according to this invention requires that especially unit 120, as well as drivers 130 and 140 are tailored for implementing the B2B operations, therefore deserving the designations B2B Display & Timing Controller 120 unit, B2B Data/Column-Driver 130, and B2B Scan/Row-Driver 140 circuits.

The technical approach to achieve the goal of avoiding most of the disadvantages with known FPD driver circuits is lowering the power consumption of an FPD during its image display operations whereby the needed OLED pre-charge actions are reduced. Using the intrinsic advantages of that solution—as described later on in detail—the construction of the circuits and the method for using these circuits according to the invention as realized with standard MOS technology is described and explained.

Figure 5:
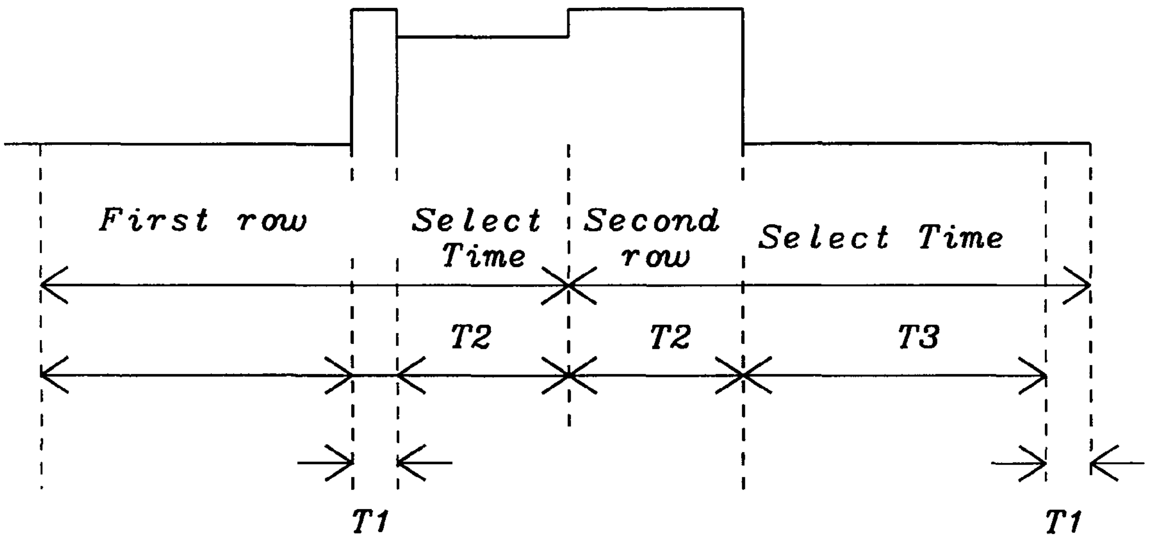
FIG. 5 shows an example for a modified pixel driving scheme used with enhanced FPD devices displaying the new "Back to Back Pre-charge Scheme" signal run of a Data/Column-Line signal according to this invention, complete with its new modified pre-charge control current signal in two adjacent time periods for subsequent display matrix rows.

Contemplating now FIG. 5, an exemplary modified Data/Column-Line 53 sub-pixel brightness driving signal is depicted as a pulse diagram, complete with superimposed pre-charge control current signal pulses according to this invention and intended for new designs of FPDs and FPD driver circuits using this invention and realized using MOS and OLED integrated circuit technologies. The given pulse diagram in FIG. 5 describing the current invention is shown for two directly following periods of row selection time segments, named 'First row Select Time' and 'Second row Select Time' applied to a certain OLED sub-pixel, whereby these row selection time segments comprise the previously discussed (see FIG. 3 Prior Art) time periods T1, T2, and T3. T1 therein designates a normally fixed Pre-charge time period, T2 is the duration of the programmed image data Driven time signal during which the OLED sub-pixel is driven towards a specific brightness using PWM methods (therefore varying time periods T2), and T3 is a time period used for discharging the OLED sub-pixel in order to reach better light-dark response times.

As an illustration for the new modified pixel driving scheme FIG. 5 depicts the signal run of the Data/Column-Line 53 sub-pixel light intensity (brightness, luminance) driving signal also named as data drive pulse or brightness drive impulse (during time period T2) complete with a superimposed pre-charge control current/voltage signal or pre-charge pulse (of time duration T1). For the sake of absolute clarity here it shall be repeated that in the following paragraph a pixel may consist of several distinct sub-pixels, whereby the terms pixel and sub-pixels are both always referring to the physical location within the physical display matrix and its physical realization, not to any contents changing in time and being displayed by that pixel or sub-pixels; if not explicitly stated otherwise however. As already explained above for optimum performance each OLED sub-pixel in an OLED display has to be pre-charged (using a voltage or a current) to the threshold or forward voltage of the intrinsic diode in order that a brightness PWM type driven waveform may have linear (or near linear) current to light conversion characteristics. In the time segment named 'First row Select Time' taken as observed time segment for the first driven row actions a Discharge time period (T3) stands at the beginning of the 'First row Select Time' segment, then follows the Pre-charge time (T1) and the image data Driven time (T2) ends at the end of the 'First row Select Time' period, thus allowing that specific OLED sub-pixel to light according to its image data programmed light intensity from a first row in image data memory. For that same OLED sub-pixel displaying the next image data from the next row in image data memory e.g. and during the next following time period named 'Second row Select Time' the "Back to Back Precharge Scheme" of this invention is applied. This enables that same OLED sub-pixel displaying the next image data during the adjacent 'Second row Select Time' period to start from a pre-charged condition (rather than a Discharged condition as in standard prior art modes shown farther above) thus saving the power normally used to pre-charge the OLED sub-pixel during the 'Second row Select Time' period. The timing within the 'Second row Select Time' period of the OLED sub-pixel thus starts at first with a time period T2 (the Driven time) activating that same physical OLED sub-pixel with its programmed next image data from that next row in image data memory e.g. followed by time period T3 (the Discharge time) and finally possibly followed by a further period of additional 'discharge time', being equivalent to the Pre-charge time T1. Depending on the drive scheme chosen this last period may be omitted as it serves no purpose except to equalize Matrix Row Scan timings. It shall be put on record that the above mentioned image data memory is not needed as internal memory within the display driver circuit itself, it has only been introduced here for a better intelligibleness of the image displaying activities by pixels and/or sub-pixels. It shall also be mentioned once again that the above description is observing the activities of one and the same pixel or its sub-pixels in different but adjacently following periods of time within the pixel driving scheme. For the sake of clarity it is also noted that the term adjacent is not referring to physically adjacent lines of pixels in the display, but to simply being adjacent in terms of the pixel or sub-pixels activation sequence. It is further mentioned here that the amplitudes or heights of the currents/voltages of the pre-charge pulses or curves in period T1 and of the data drive pulses or curves in period T2 may be different, as well as the length of the periods themselves.

Leaving out every second Pre-charge operation without any other devastating effects on image quality allows for substantially power saving, because the power needed for pre-charge in general represents a significant portion of the total power consumption of an OLED FPD, but has little impact on the overall visual performance (other than the brightness vs. time linearization already described above).

Figure 6A:
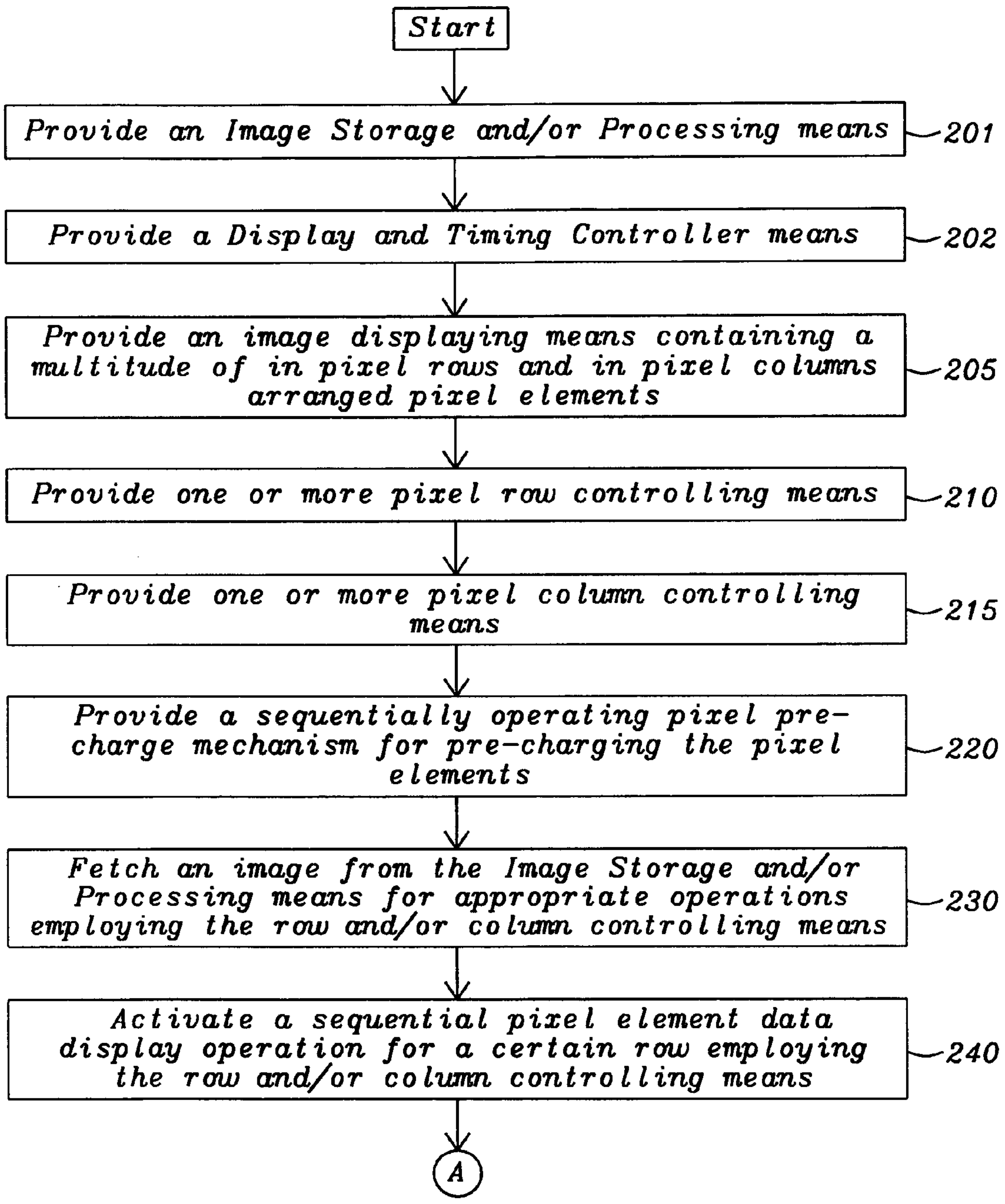
FIGS. 6A-6B describe with the help of a flow diagram the new method of this invention called "Back to Back Pre-charge Scheme" as shown by FIG. 5 and described in the specification and thus allowing substantial power savings for FPD devices, whereas the advantages from applying a standard pre-charge scheme are still kept.
Figure 6B:
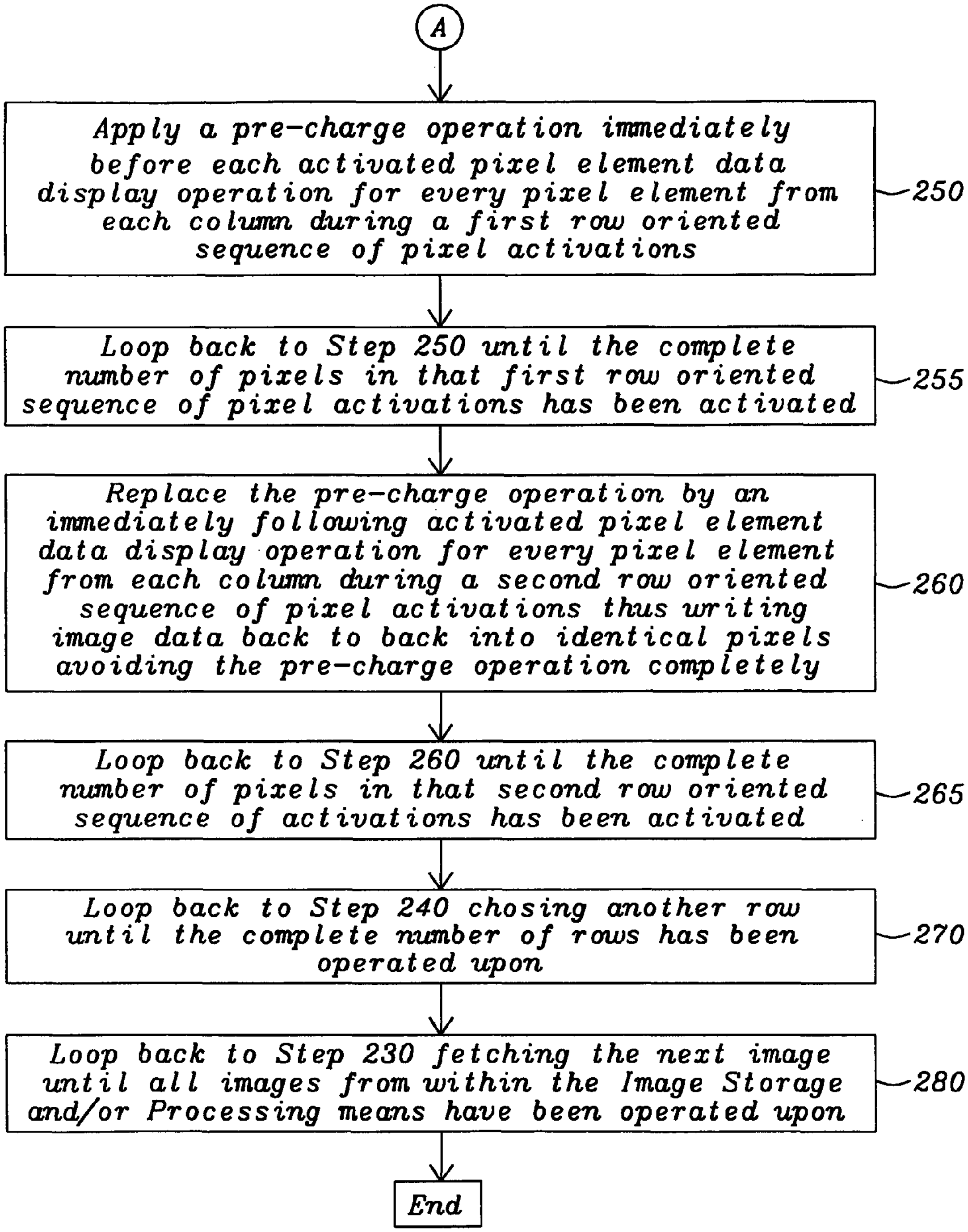

Regarding the flow diagram given by FIGS. 6A-6B the method for implementing the "Back to Back Precharge Scheme" for Flat Panel Display devices according to the invention and illustrated by FIG. 5 is now described and defined by its steps, wherein the first steps 201-220 provide an Image Storage and/or Processing means, a Display and Timing Controller means, an image displaying means containing a multitude of in pixel rows and pixel columns arranged pixel elements, one or more pixel row controlling means, one or more pixel column controlling means, and a sequentially operating pixel pre-charge mechanism for pre-charging the pixel elements. With step 230 the main loop named 'fetching' is started by fetching of an image from the Image Storage and/or Processing means for appropriate operations employing the row and/or column controlling means, step 240 enters a next loop named 'activating' by activating a sequential pixel element data display operation for a certain row employing the row and/or column controlling means, wherein with step 250 another loop named 'applying' is begun applying a pre-charge operation immediately before each activated pixel element data display operation for every pixel element from each column during a first row oriented sequence of pixel activations. Step 255 now is already looping back to the previous step 250 named 'applying' until the complete number of pixels in that first row oriented sequence of pixel activations has been activated. Step 260 again enters a new loop operation named 'replacing' by replacing the pre-charge operation by an immediately following activated pixel element data display operation for every pixel element from each column during a second row oriented sequence of pixel activations thus writing image data back to back into identical pixels avoiding the pre-charge operation completely, whereby step 265 is already looping back to the previous step 260 named 'replacing' until, the complete number of pixels in that second row oriented sequence of activations has been activated. Step 270 is then looping back to step 240 named 'activating' until the complete number of rows has been operated upon, and step 280 is finally looping back to step 230 named 'fetching' until all images from within the Image Storage and/or Processing means have been operated upon.

It shall be noted here, that no assumption is made whether the column operations regarding activation for each pixel or sub-pixel are activated sequentially or in certain groups or strictly in parallel, whereby the latter method is however most commonly used in reality, signifying that the columns are all driven in parallel according to their display data values i.e. all columns with data 'five' e.g. are driven with the same respective voltage/current timing, all columns with data 'ten' e.g. are driven again with the same respective but different voltage/current timing and so on. The voltage/current timing of which is different in being distinct with respect to all other columns with different data (the number of encoded gray levels or color intensities e.g. determines the number of column voltage/current drive waveforms, that is the voltage/current timing and thus having no relation to the number of columns.)

Figure 7:
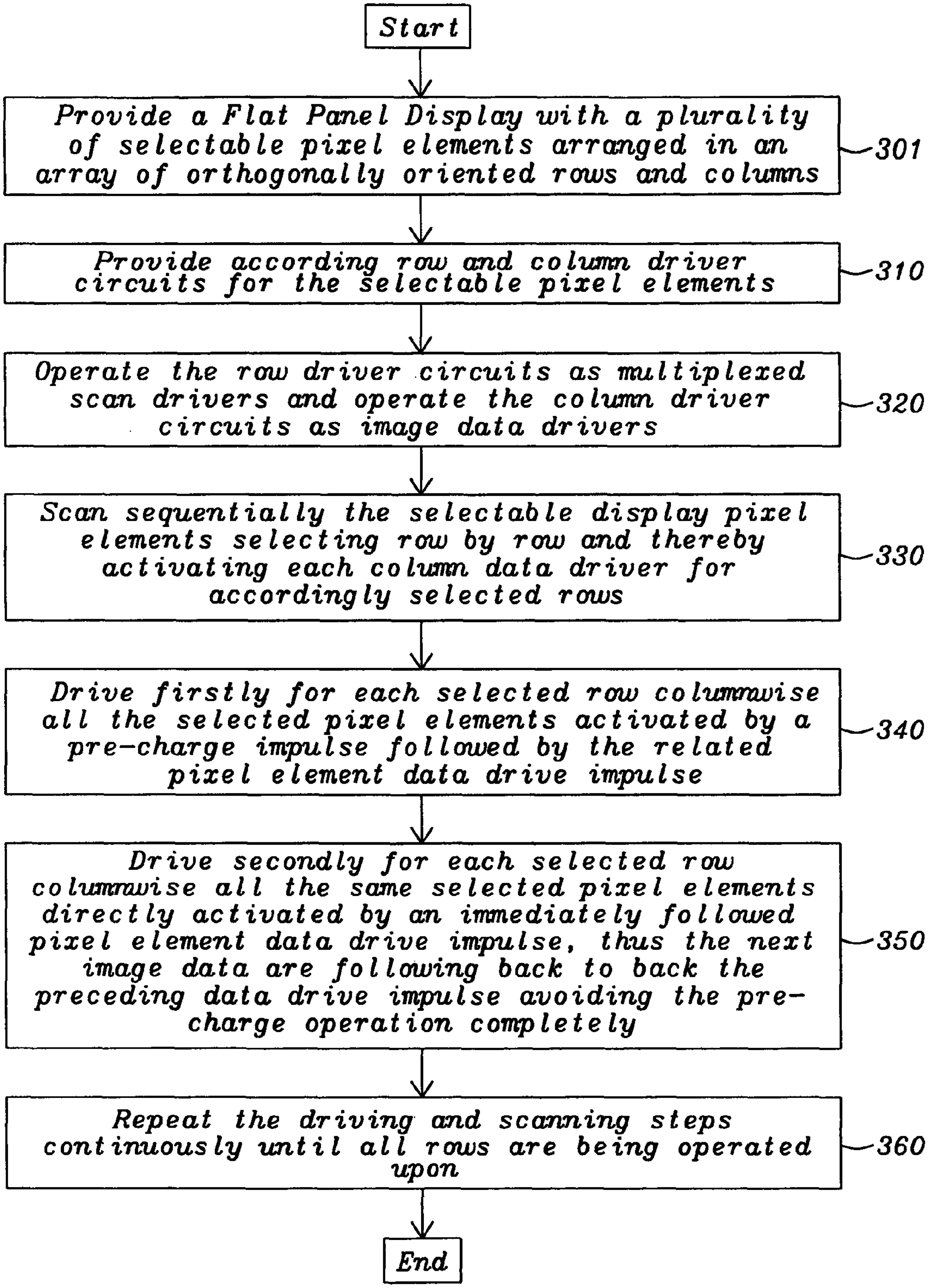
FIG. 7 describes again with the help of another flow diagram that new "Back to Back Pre-charge Scheme" method as shown in FIG. 5 according to the current invention and described in the specification in more detail.

Regarding the flow diagram given by FIG. 7 the method for implementing the "Back to Back Precharge Scheme" for Flat Panel Display devices according to the invention and illustrated by FIG. 5 is now described differently and defined by its steps, wherein the first two steps 301 and 310 provide a Flat Panel Display with a plurality of selectable pixel elements arranged in an array of orthogonally oriented rows and columns and the according row and column driver circuits for the selectable pixel elements. Step 320 operates the row driver circuits as multiplexed scan drivers and operates the column driver circuits as image data drivers. Step 330 is sequentially scanning the selectable display pixel elements selecting row by row and thereby sequentially activating each column data driver for accordingly selected rows. Steps 340 and 350 are both driving namely firstly for each selected row columnwise all the selected pixel elements activated by a pre-charge impulse followed by the related pixel element data drive impulse and secondly for each selected row columnwise all the same selected pixel elements directly activated by an immediately followed pixel element data drive impulse, thus the next image data are following back to back the preceding data drive impulse avoiding the pre-charge operation completely. Finally step 360 is repeating the driving and scan steps continuously until all rows are being operated upon.

The scope for applications of the new "Back to Back Precharge Scheme" according to this invention is wide-spread, comprehending not only the above mentioned Single Line Addressing (SLA) techniques, which in the descriptions of the methods above by the help of single line drive schemes only has been silently implied, but also comprehending all possible Multi Line Addressing (MLA) schemes including the Consecutive MLA (CMLA) and the Advanced MLA (AMLA) scheme. By implementing an expanded "Back to Back Precharge Scheme" where the B2B pre-charge operations charge two or more rows with OLED pixels at the same time, significant electrical power can be saved. These commonly addressed lines are thereby not confined to adjacent lines only, they only have to be addressed with identical image contents at the same time. Thus the power saving feature of the "Back to Back Precharge Scheme" can be applied to all addressing schemes without interference with their generic methods. It seems worth to separately mention the fact, that this "Back to Back Precharge Scheme" is not relying on neighborhood effects e.g. caused by parasitic capacitances from adjacent pixels, arranged in adjacent rows or adjacent lines and thus is valid for and applicable to every single pixel as such.

It is understood that the proposed embodiment with components as particularly shown here, and described and explained above is chosen only as a demonstration for the teachings and ideas of this invention. The teachings and ideas of the proposed schemes and methods can therefore also be applied to circuits with varying components, and also to circuits with other transistor technologies. Several hints and remarks to this conclusion have already been given above.

The current invention has now been electrically and technologically described and explained in great detail. The manufacturing process for semiconductor realizations in MOS technology is especially suited for these type of larger current source arrays.

Summarizing the essential features of the realization of the circuit we find, that in integrated circuit embodiments of the present invention a novel circuit and method is implemented, able to provide an easy and power saving algorithm implemented which altogether results in better reliability and quality products.

As shown in the preferred embodiment the novel system, circuits and methods provide an effective and manufacturable alternative to the prior art. Consequently, although only one typical embodiment of the present invention has been described in detail, it should be understood that the present invention may be embodied in many other specific forms without departing from the spirit or scope of the invention. Substitutions and variations on the inventive concepts are possible and are within the skills of one skilled in the art given this disclosure. In view of the foregoing, it should be apparent that the present examples are to be considered as illustrative and not restrictive, and the invention is not to be limited to the details given herein, but may be modified within the scope of the appended claims. While the invention has been particularly illustrated and described with reference to the preferred embodiment, it will be understood by those skilled in the art that various changes in form and details may be made without departing from the spirit and scope of the invention. This shall especially be valid for circuits having no internal image storing capabilities. Having shown and explained the principles of this invention with the aid of the given method it should also be readily apparent to those skilled in the art that the invention can be modified in arrangement and structure without departing from such principles. We therefore claim all modifications coming within the spirit and scope of the accompanying claims.

What is claimed is:

1. A circuit for a flat panel display capable to display images, comprising:

an image storage and/or processing block for said images to be displayed, made up of appropriate image data;

a display and timing controller block controlling said display operation;

an image pixel matrix containing a multitude of row and column arranged pixel elements;

one or more controlled row driver blocks;

one or more controlled column driver blocks; and a pixel pre-charge and display drive mechanism for displaying said pixel elements employing a back to back pre-charge operation applied in each case to pairs of row and/or column drive activated pixel element display operations of said image data, whereby said back to back pre-charge operation is signified by during every pair of pixel element display operating sequences two differently modified timing sequences within every two row and/or column drive activated sequential pixel element display operations are used at a time, replacing said pre-charge operation by an immediately following activated pixel element data display operation for every pixel element from each column during a second row oriented sequence of pixel activations thus writing image data back to back into identical pixels avoiding the pre-charge operation completely; thus functionally substituting a potentially second pre-charge operation directly by the next activated pixel element display drive operation of the same pixel according to an adjacently following period of time within a pixel driving scheme itself and thus executing said back to back pre-charge operation for each single pixel element as one and the same given entity.

2. The circuit according to claim 1 whereby said back to back pre-charge and display drive mechanism for pixel element display operations of said image data comprises that during every operating sequence of row and/or column drive activated pixel element display operations the amplitude of the related drive impulse within said activated sequential pixel element display operation is different.

3. The circuit according to claim 1 wherein said image pixel matrix comprises a passive matrix device.

4. The circuit according to claim 1 wherein said image pixel matrix comprises an active matrix device.

5. The circuit according to claim 1 wherein said image storage and/or processing block comprises memory for more than one image frame.

6. The circuit according to claim 1 wherein said image storage and/or processing block comprises memory for only one single image frame.

7. The circuit according to claim 1 wherein said image storage and/or processing block comprises memory for parts only of an image frame.

8. The circuit according to claim 1 wherein said image storage and/or processing block comprises a digital processor.

9. The circuit according to claim 8 wherein said digital processor comprises an ASIC device.

10. The circuit according to claim 8 wherein said digital processor comprises an FPGA device.

11. The circuit according to claim 8 wherein said digital processor comprises a general purpose CPU and memory.

12. The circuit according to claim 11 wherein said memory comprises RAM.

13. The circuit according to claim 11 wherein said memory comprises ROM.

14. The circuit according to claim 1 wherein said sequentially operating pixel pre-charge mechanism comprises a multiplexed scanning of said rows of said matrix of pixel elements.

15. The circuit according to claim 14 wherein said multiplexed scanning refers to a single row of said matrix of pixel elements at a time.

16. The circuit according to claim 14 wherein said multiplexed scanning refers to multiple rows of said matrix of pixel elements at a time.

17. The circuit according to claim 1 wherein said sequentially operating pixel pre-charge mechanism comprises a pixel element display operation by driving of said pixel elements of said columns with appropriate image data.

18. The circuit according to claim 17 wherein said pixel element display operation relates to all columns at a time.

19. The circuit according to claim 1 wherein the components of said blocks are MOSFET components.

20. The circuit according to claim 19 wherein said MOSFET components are of the CMOS type.

21. The circuit according to claim 1 wherein said pixel elements comprise LEDs.

22. The circuit according to claim 21 wherein said LEDs comprise OLEDs.

23. The circuit according to claim 21 wherein said LEDs comprise PLEDs.

24. A circuit for a flat panel display capable to display images, comprising:

an image storage and/or processing means;

a display and timing controller means;

an image displaying means containing a multitude of in rows and columns arranged pixel elements;

one or more row controlling means;

one or more column controlling means; and a pixel pre-charge and display drive mechanism for displaying said pixel elements employing a back to back pre-charge operation applied in each case to pairs of row and/or column drive activated pixel element display operations of said image data and activated by said row and/or column controlling means, whereby said back to back pre-charge operation is signified by that during every pair of pixel element display operating sequences two differently modified timing sequences within every two row and/or column drive activated sequential pixel element display operations are used at a time, replacing said pre-charge operation by an immediately following activated pixel element data display operation for every pixel element from each column during a second row oriented sequence of pixel activations thus writing image data back to back into identical pixels avoiding the pre-charge operation completely; thus functionally substituting a potentially second pre-charge operation directly by the next activated pixel element display drive operation of the same pixel according to an adjacently following period of time within a pixel driving scheme itself and thus executing said back to back pre-charge operation for each single pixel element as one and the same given entity.

25. The circuit according to claim 24 whereby said back to back pre-charge and display drive mechanism for pixel element display operations of said image data comprises that during every operating sequence the amplitude of the related drive impulse within said activated sequential pixel element display operation is different.

26. A method for a power saving flat panel display driver pre-charge operation, comprising:

providing a flat panel display with a plurality of selectable pixel elements arranged in an array of orthogonally oriented rows and columns;

providing according row and column driver circuits for said selectable pixel elements;

operating said row driver circuits as multiplexed scan drivers and said column driver circuits as image data drivers;

scanning sequentially said selectable display pixel elements selecting row by row and thereby activating each column data driver for accordingly selected rows;

driving firstly for each selected row columnwise all said selected pixel elements activated by a pre-charge impulse followed by the related pixel element data drive impulse;

driving secondly for each selected row columnwise all said same selected pixel elements directly activated by an immediately followed pixel element data drive impulse, replacing said pre-charge operation by an immediately following activated pixel element data display operation for every pixel element from each column during a second row oriented sequence of pixel activations thus writing image data back to back into identical pixels avoiding the pre-charge operation completely, thus the next image data of the same pixel according to an adjacently following period of time within a pixel driving scheme are following back to back the preceding data drive impulse avoiding said pre-charge operation completely; and repeating said driving and scanning steps continuously until all rows are being operated upon.

27. The method according to claim 26 wherein said step of scanning sequentially said selectable display pixel elements selecting row by row refers to scanning a single row at a time.

28. The method according to claim 26 wherein said step of scanning sequentially said selectable display pixel elements selecting row by row refers to scanning multiple rows at a time.

29. The method according to claim 26 wherein said steps of driving for each selected row columnwise all said selected pixel elements comprise driving single column at a time.

30. The method according to claim 26 wherein said steps of driving for each selected row columnwise all said selected pixel elements comprise driving multiple columns at a time.

31. The method according to claim 26 wherein said steps of driving for each selected row columnwise all said selected pixel elements comprise driving all columns at a time.

32. A method for a back to back pre-charge operation for flat panel displays comprising:

providing an image storage and/or processing means;

providing a display and timing controller means;

providing an image displaying means containing a multitude of in pixel rows and in pixel columns arranged pixel elements;

providing one or more pixel row controlling means;

providing one or more pixel column controlling means;

providing a sequentially operating pixel pre-charge mechanism for pre-charging said pixel elements;

fetching an image from said image storage and/or processing means for appropriate operations employing said row and/or column controlling means;

activating a sequential pixel element data display operation for a certain row employing the row and/or column controlling means;

applying a pre-charge operation immediately before each activated pixel element data display operation for every pixel element from each column during a first row oriented sequence of pixel activations;

looping back to previous step until the complete number of pixels in that first row oriented sequence of pixel activations has been activated;

replacing said pre-charge operation by an immediately following activated pixel element data display operation for every pixel element from each column during a second row oriented sequence of pixel activations thus writing image data back to back into identical pixels avoiding the pre-charge operation completely;

looping back to previous step until the complete number of pixels in that second row oriented sequence of activations has been activated;

looping back to step 'activating' choosing another row until the complete number of rows has been operated upon; and looping back to step 'fetching' fetching the next image until all images from within the image storage and/or processing means have been operated upon.

33. The method according to claim 32 wherein said step of activating a sequential pixel element data display operation for a certain row comprises a multiplexed scanning referring to one single row at a time.

34. The method according to claim 32 wherein said step of activating a sequential pixel element data display operation for a certain row comprises a multiplexed scanning referring to more than one rows at a time.

35. The method according to claim 32 wherein said step of activating a sequential pixel element data display operation for a certain row comprises a pixel element display operation by driving said pixel elements of said columns with appropriate image data.

36. The method according to claim 35 wherein said pixel element display operation refers to all columns at a time.

37. A method for a back to back pre-charge operation for flat panel displays comprising:

providing an image storage and/or processing means, a display and timing controller means, an image displaying means containing a multitude of in pixel rows and in pixel columns arranged pixel elements as well as one or more pixel row and pixel column controlling means;

providing a sequentially operating pixel pre-charge mechanism for pre-charging said pixel elements;

fetching an image from said image storage and/or processing means for appropriate operations employing said row and/or column controlling means;

activating a sequential pixel element data display operation for a certain row employing the row and/or column controlling means;

applying a pre-charge operation immediately before each activated pixel element data display operation for every pixel element from each column during a first row oriented sequence of pixel activations;

looping back to previous step until the complete number of pixels in that first row oriented sequence of pixel activations has been activated; and replacing said pre-charge operation by an immediately following activated pixel element data display operation for every pixel element from each column during a second row oriented sequence of pixel activations thus writing image data back to back into identical pixels avoiding the pre-charge operation completely.

38. The method according to claim 37 further comprising:

looping back to step 'replacing said pre-charge operation by an immediately following activated pixel element data display operation for every pixel element' until the complete number of pixels in that second row oriented sequence of activations has been activated;

looping back to step 'activating' choosing another row until the complete number of rows has been operated upon; and looping back to step 'fetching' fetching the next image until all images from within the image storage and/or processing means have been operated upon.

* * * * *